Figure 1:
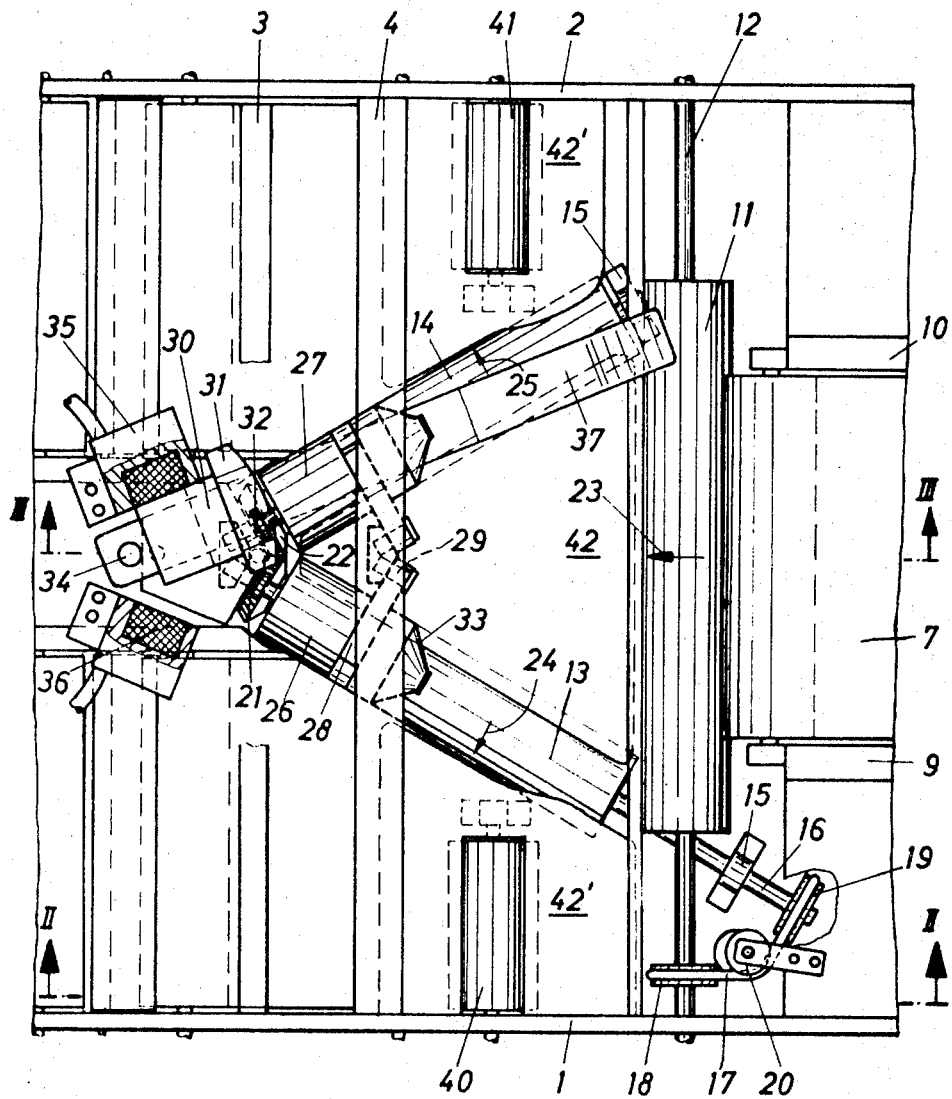

United States Patent
Kluge et al.

[11] 3,738,644
[45] June 12, 1973

[54] APPARATUS FOR SEPARATING A ROW OF TIERLIKE SUPERPOSED FLAT ARTICLES, PARTICULARLY NEWSPAPERS

[76] Inventors: Willi Kluge; Reinhard Kluge, both of D-63 Griessen, Kugelberg, 55, Germany

[22] Filed: June 2, 1971

[21] Appl. No.: 149,204

[30] Foreign Application Priority Data
June 4, 1970 Germany............... P 20 27 422.0

[52] U.S. Cl.............. 271/64, 93/93 C, 198/31 R, 198/81, 271/69
[51] Int. Cl.......................................... B65h 29/60
[58] Field of Search............ 271/64, 76, 69, 52; 93/93 C, 93 DP; 198/31 R, 188, 83, 81

[56] References Cited
UNITED STATES PATENTS

| | | | |
|---|---|---|---|
| 3,525,444 | 8/1970 | Brockmuller | 93/93 C |
| 3,115,961 | 12/1963 | Layton | 198/31 R X |
| 3,313,221 | 4/1967 | Gubeli | 93/93 DP |
| 3,642,113 | 2/1972 | Burgis | 198/81 X |
| 2,243,557 | 5/1941 | Finster | 271/52 |
| 1,071,272 | 8/1913 | Spiess | 271/76 |
| 3,312,330 | 4/1967 | Juengel | 198/81 |
| 3,239,676 | 3/1966 | Pali | 93/93 C |
| 3,587,826 | 6/1971 | Holzer et al. | 198/83 |

*Primary Examiner*—Evon C. Blunk
*Assistant Examiner*—Bruce H. Stoner, Jr.
*Attorney*—Woodhams, Blanchard and Flynn

[57] ABSTRACT

An apparatus for deviding a row of tierlike superposed flat articles, particularly newspapers, which row rests on a main conveyor belt, into two dividing rows. The apparatus is characterized by at least one swordlike slide having an operating mechanism for insertion of the slide between two articles lying one on top of the other. In addition, two rollers (dividing rollers) are provided having a friction coating thereon and are arranged below a table and extend with their upper sides through slots in the table. The upper sides of the rollers are positioned lower than the transporting surface of the conveyor belt and the axes of which are arranged parallel to the direction of movement of the main conveyor belt or V-shaped in such a manner that the dividing rollers at an increasing distance from the main conveyor belt approach one another. A movable roller cover is provided which is interchangeably associated with the one or the other of the dividing rollers for covering same. Conveyor belts (divided flow conveyor belts) are connected after the dividing rollers and a counting device is provided for the articles conveyed by the main conveyor belt or the divided flow conveyor belts. A control and operating mechanism is provided for periodically moving the slide and the roller cover in such a manner that the roller cover is changed over to a different dividing roller when the slide holds the papers away from the dividing rollers after a predetermined number of articles have been conveyed.

13 Claims, 6 Drawing Figures

APPARATUS FOR SEPARATING A ROW OF TIERLIKE SUPERPOSED FLAT ARTICLES, PARTICULARLY NEWSPAPERS

Newspapers after being discharged from the printing machine are usually delivered in a tierlike superposed condition onto a conveyor belt. The amount delivered per unit of time is large and amounts to approximately 50,000 to 60,000 newspapers per hour. The further processing of such a large number of papers, for example in an apparatus for the manufacture of newspaper packages (so-called package display) or in a newspaper insertion device in which additions are supposed to be inserted into each newspaper, is a problem because of the limited working frequency of such devices. It is for this reason desirable to divide or split the flow of newspapers in order to be able to use dual systems which operate with half of the working frequency, namely at a frequency of, for example, 25,000 to 30,000 working operations per hour.

In producing a dividing apparatus, it must be considered that the front edges of the newspapers have a distance from one another of only approximately 3 cm., thus are covered or overlapped over approximately 80 to 90 percent of their surface so that ten newspapers are positioned one above the other when measured vertically to the newspaper row. This results in a relatively great inflexibility of the newspaper row. The foregoing problem was described in connection with the frequent example of newspapers. The same problem can, however, also exist in the case of other superposed flat articles, for example, in superposed printed foils or any other surfacelike mass articles.

The basic purpose of the invention is therefore to produce a dividing apparatus which permits, in spite of the unyieldingness of the row of tierlike superposed flat articles, a division into two divided paths whereby each divided path consists of relatively short sections.

The inventive apparatus for dividing a row (newspaper row) of tierlike superposed flat articles, particularly newspapers, which row rests on a main conveyor belt, into two dividing rows is characterized by at least one swordlike slide having an operating mechanism for insertion of the slide between two articles lying one on top of the other. In addition, two rollers (dividing rollers) are provided having a friction coating thereon and are arranged below a table and extend with their upper sides through slots in the table. The upper sides of the rollers are positioned lower than the transporting surface of the conveyor belt and the axes of which are arranged parallel to the direction of movement of the main conveyor belt or V-shaped in such a manner that the dividing rollers at an increasing distance from the main conveyor belt approach one another. A movable roller cover is provided which is interchangeably associated with the one or the other of the dividing rollers for covering same. Conveyor belts (divided flow conveyor belts) are connected after the dividing rollers and a counting device is provided for the articles conveyed by the main conveyor belt or the divided flow conveyor belts. A control and operating mechanism is provided for periodically moving the slide and the roller cover in such a manner that the sheet cover is changed over to a different dividing roller when the slide holds the papers away from the dividing rollers after a predetermined number of articles have been conveyed.

In an apparatus which is constructed in such a manner, a tier which due to the substantial overlapping of the flat articles is relatively rigid can also be divided into two divided paths in such a manner that interchangeably relatively small sections of the newspaper row are guided onto the divided flow rows. This is possible since by insertion of the slide a clean separation of the short row sections from the entire newspaper row is possible. Namely, the slide keeps the main row from the just then operating dividing roller so that all flat articles provided below the slide can be conveyed away without an oblique pull of the tier. After the sheet cover has been changed over to the dividing roller which had just conveyed and after moving the slide in such a position that same no longer fulfills its holding away function, the flat articles are engaged or gripped by the other dividing roller which now is no longer covered and are directed onto the other divided row.

Figure 2:
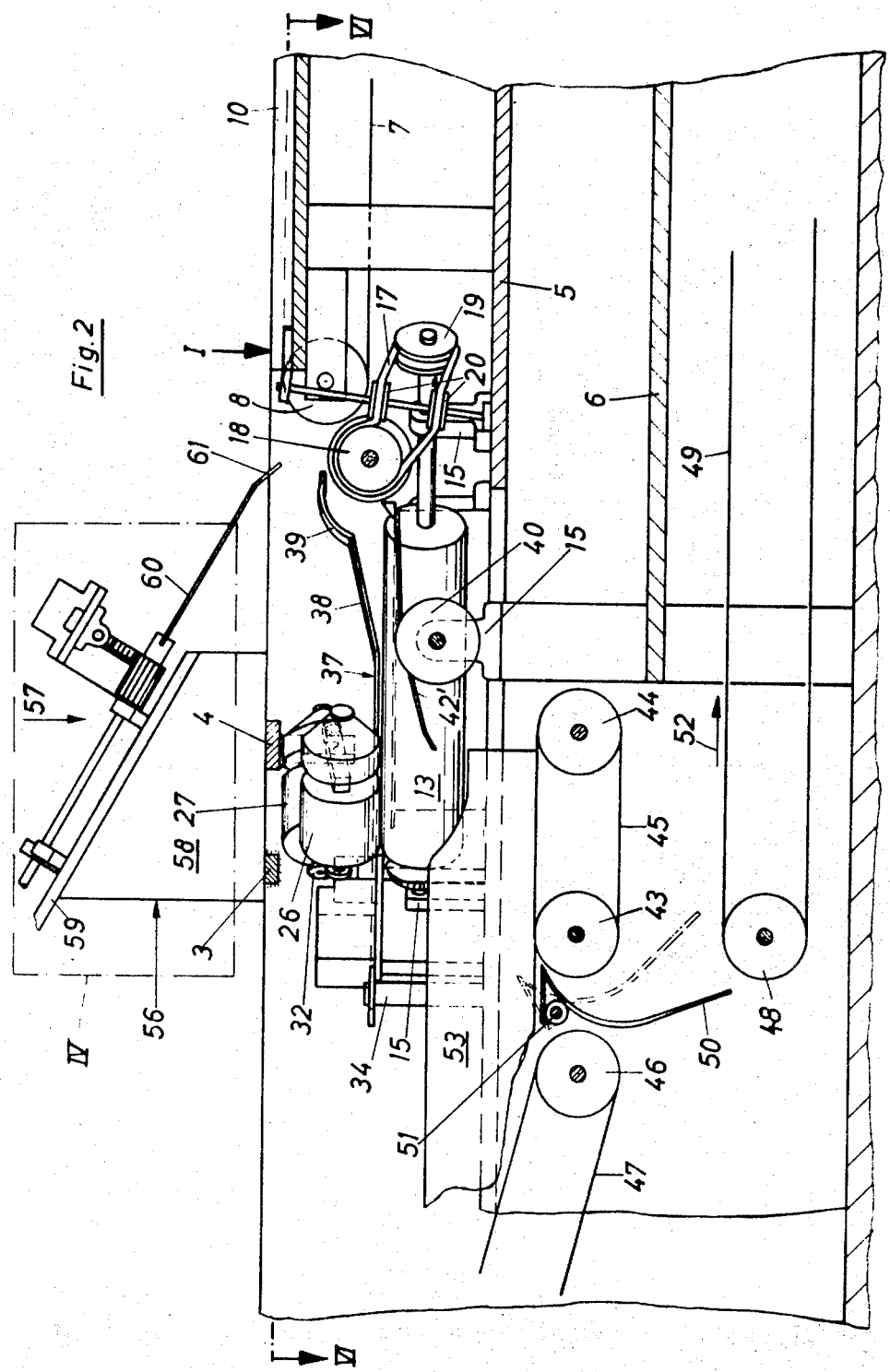
Figure 3:
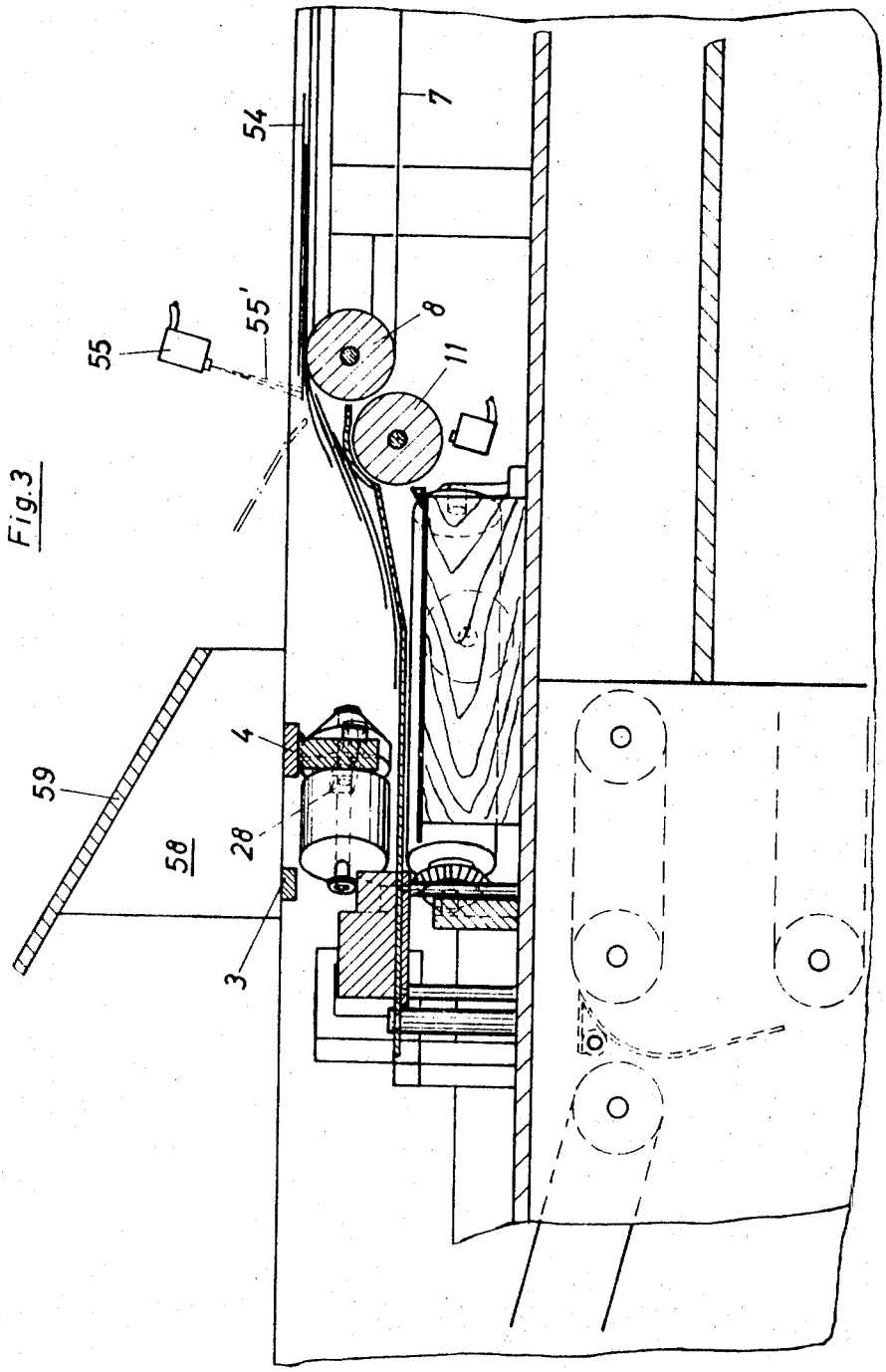
Figure 4:
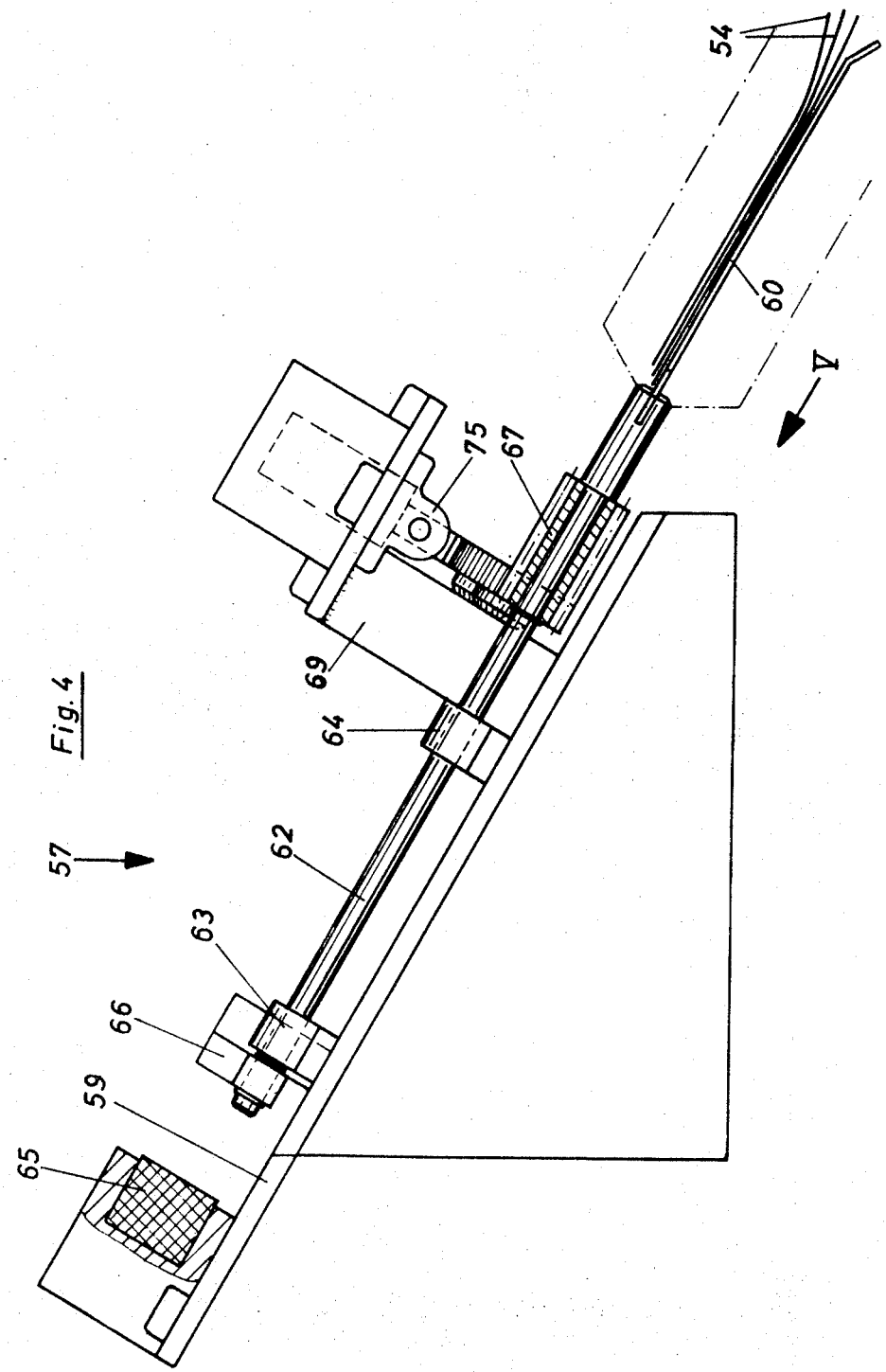
Figure 5:
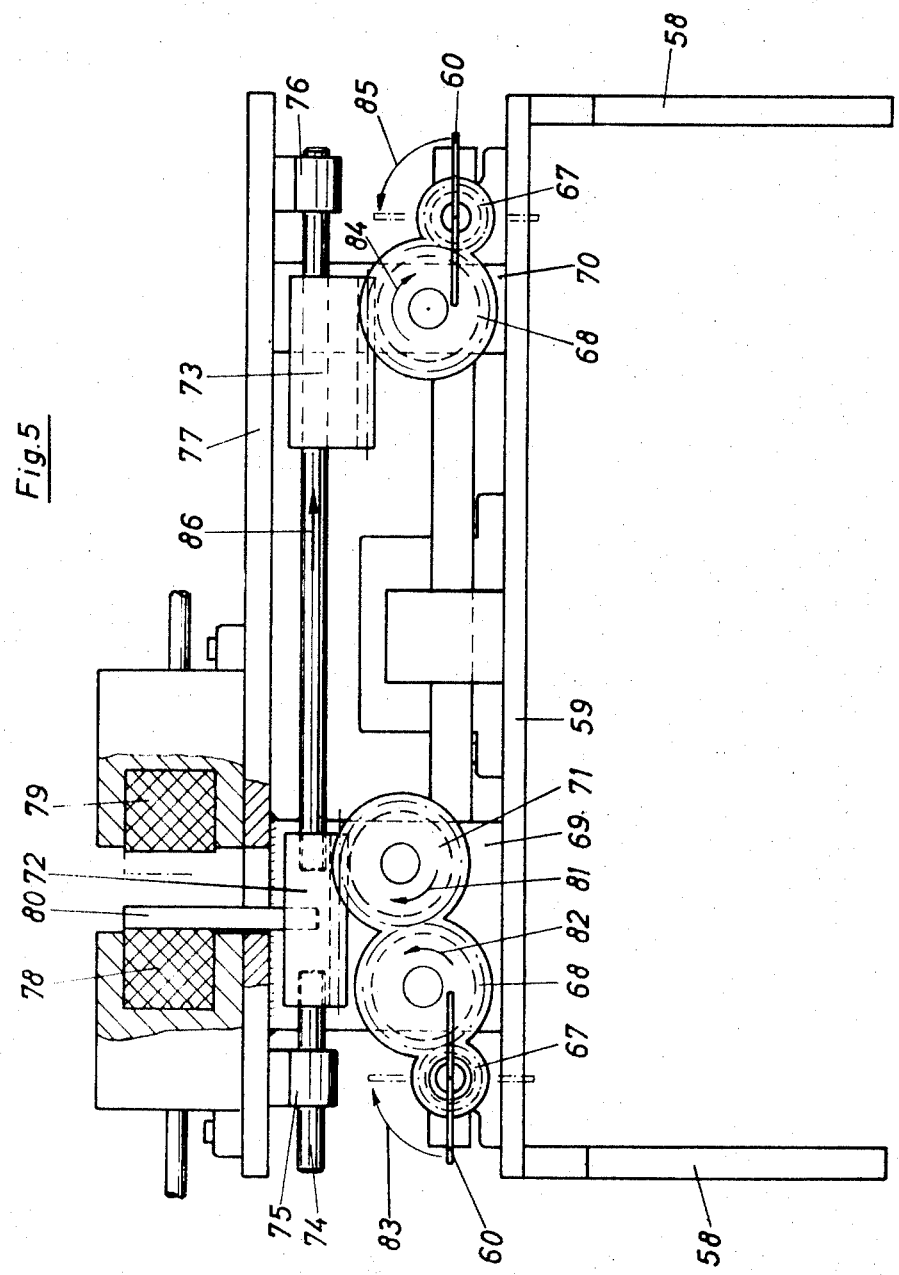
Figure 6:
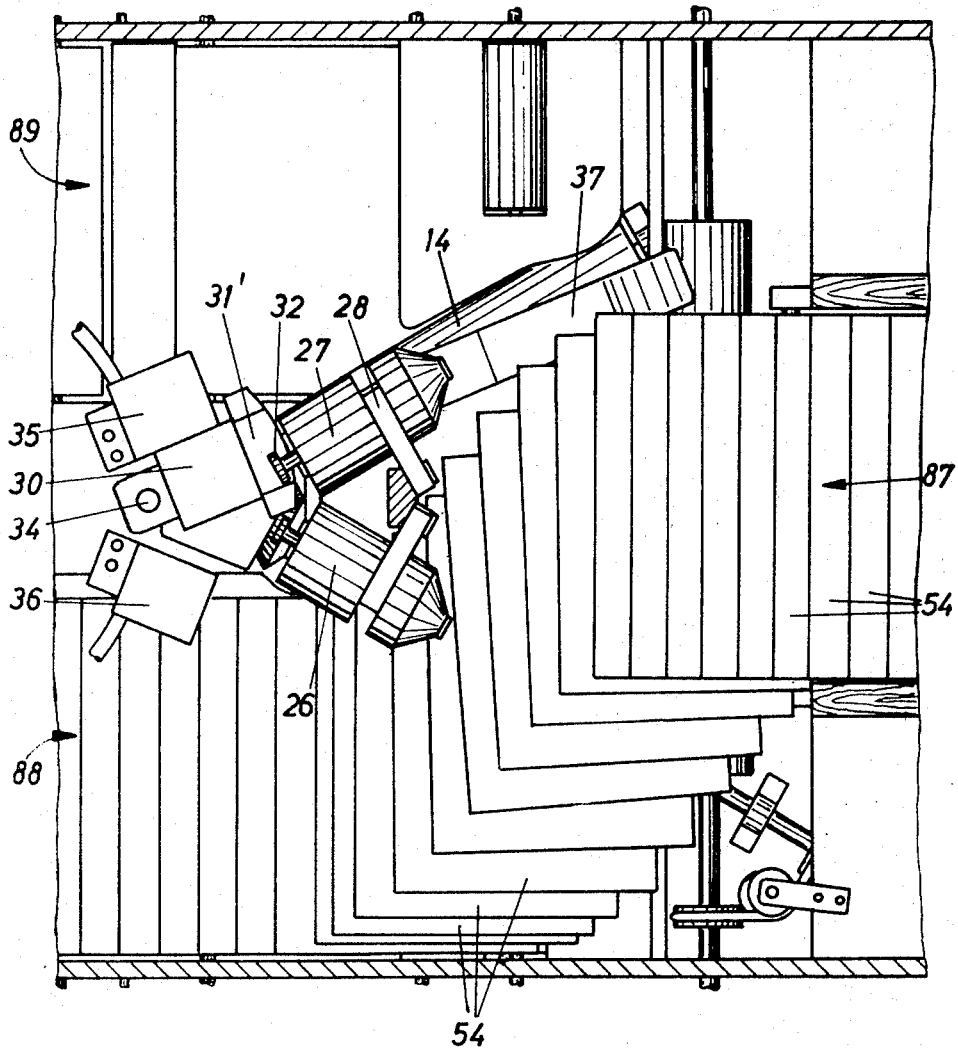

Further developments of the inventive apparatus and special embodiments are defined in the subclaims and are described hereinafter in connection with the drawings, in which:

FIG. 1 is a top view of an exemplary embodiment of the inventive apparatus, whereby, however, the slides have been left out, along the line I—I of FIG. 2, FIG. 2 is a cross-sectional view along the line II—II of FIG. 1, whereby, however, the slides are illustrated, FIG. 3 is a cross-sectional view along the line III—III of FIG. 1, whereby in addition the support platform for the slide has been illustrated, FIG. 4 is a cutout portion of FIG. 2 in the zone of the dash-dotted frame IV of FIG. 2 in an enlarged scale compared with FIG. 2, FIG. 5 is a front view of the slide arrangement in direction of the arrow V of FIG. 4, and FIG. 6 is a top view according to FIG. 1, however, showing a processing of newspapers.

The apparatus comprises a frame which has two side plates 1 and 2 which are supported against one another by several transverse connections, for example by the transverse connector members 3 and 4. Transverse connector members in the form of continuous platforms 5 and 6 are also provided which are sectioned in FIG. 2.

Part of the apparatus is a main conveyor belt 7 which is placed over a front guide roller 8 on which, as will be described later, the flow of newspapers which are to be separated arrives. Guide bars 9 and 10 are provided laterally of the belt 7.

A main roller 11, which is supported on a shaft 12 secured to the two plates 1 and 2, is positioned slightly lower than the main conveyor belt 7. Two dividing rollers 13 and 14 are provided which are positioned in a V-shape relationship to one another and to the left from the main roller 11 as viewed in FIG. 1. These dividing rollers are supported in bearing blocks mounted on the intermediate plate 5 and each of which has the reference numeral 15. The main roller 11 and the dividing rollers 13 and 14 are coupled to one another for driving by a driving belt 17 which is placed over a belt pulley 18 fixedly connected to the shaft 12 and a belt pulley 19 fixedly connected to the shaft 16. The driving belt is used for the driving connection between the shaft 12, the main roller 11 and the shaft 16 of the dividing roller 13. Since the belt pulleys 18 and 19 are arranged in different planes, the belt is placed over the guide rollers 20. Bevel gears 21, 22 which are fixedly connected to the shafts of the dividing rollers 13 and 14 are used for the driving connection between the dividing roller 13 and the dividing roller 14. The directions of rotation of the rollers 11, 13, 14 correspond to the arrows 23, 24 and 25 in FIG. 1.

Pressure rollers or dandy rollers 26, 27 which can be lifted off from the dividing rollers 13, 14 cooperate with the dividing rollers 13, 14. For the purpose of lifting off, the pressure rollers 26, 27 are each supported on a swivel arm 28 which is swingably supported on the frame at 29 (FIG. 1). The lifting of the rollers, which do not have their own drive, is done by a swivel piece 30 which has a control surface 31 that cooperates with the rollers 32 and which are secured to the axes of the pressure rollers 26, 27. The front ends 33 of the relatively short pressure rollers have a conical shape.

The swivel part 30 is hingedly connected to the machine frame at 34. Electromagnets 35, 36 are arranged laterally of the swivel part, which magnets cooperate with the swivel part 30. The energized magnet attracts the part 30. A roller cover 37, the side profile of which can be seen in FIG. 2, is connected to the swivel part 30. FIG. 2 shows that the roller cover 37 has an inclined portion 38 and a curved end portion 39. This shape permits the roller cover 37 to partly cover also the main roller 11.

Auxiliary rollers 40, 41 are illustrated in FIG. 1, which auxiliary rollers are arranged laterally outside the dividing rollers 13, 14. The dividing rollers 13, 14 and the auxiliary rollers 40, 41 are arranged below a table 42 which has openings through which extend the upper sides of the rollers 13, 14, 40, 41. The parts 42' of the table 42, which are near the auxiliary rollers 40, 41, are positioned slightly lower than the control portion of the table.

Further conveyor belts are arranged in the lower part of the frame, namely a conveyor belt 45 running over rollers 43, 44, a conveyor belt 47 running over a roller 46 and a conveyor belt 49 running over a roller 48. The conveyor belts 45 and 47 together form a divided path over which a divided flow of newspapers is directed. A deflector plate 50 is arranged between the rollers 43 and 46, which plate can be pivoted about an axis 51 from the position illustrated in full lines into the position illustrated in dash-dotted lines. From inspection of the drawings, it is clear that, when the deflector plate 50 is in the position illustrated in full lines, the articles reach from the conveyor belt 45 onto the rising conveyor belt 47. If, however, the deflector plate 50 is in the position illustrated in dash-dotted lines, the articles are deflected to the lower conveyor belt 49 which moves in direction of the arrow 52 and over which the articles are guided out of the apparatus in case of a breakdown.

Laterally of the conveyor belts 45, 47, there is arranged a guide plate 53.

A photoelectric cell 55 (FIG. 3) of a light barrier is also illustrated in the cross-section of FIG. 3. The photoelectric cell is adjusted in such a manner that it scans the front edges of the newspapers 54 as indicated by the beam 55'.

It can be seen from FIG. 2, that a support mechanism, identified in whole by 56, for a slide arrangement, identified in whole by 57, is mounted to the frame of the machine. The support mechanism consists of side plates 58 which are secured on the traverses 3, 4 and an upper plate 59 which is positioned at an inclination and secured on the side plates 58. The slide arrangement 57 is now supposed to be considered more in detail in connection with FIGS. 4 and 5.

The slide arrangement 57 contains two slides 60 of which, however, only one is visible in the side view of FIG. 4. The slide is constructed swordlike. Its front end 61 is bent downwardly (see FIG. 2). Each swordlike slide 60 is held on a rod 62 which is movable longitudinally and rotatable in bearing blocks 63 and 64 which are secured to the support plate 59.

Electromagnets 65 which are fixedly secured to the plate 59 are used for moving the slides 60 back and forth. Upon energization, these magnets attract blocks 66 which are secured on the rear ends of the rods 62 and thus pull the rods 62 back. Furthermore the slides are rotatable. For the purpose of rotation, a relatively very wide gear 67 is nonrotatably mounted on each rod 62. The width of the gear is at least as large as the possible longitudinal movement of the rod 62 plus twice the width of a gear mating with the gear 67. The rotating apparatus can best be seen in FIG. 5.

FIG. 5 illustrates that the slide arrangement 57 consist of two laterally spaced slides 60 which are supported near the inclined extending edges of the support plate 59. Gears 68 which are supported in bearing plates 69 or 70 which extend upwardly from the support plate 59 mate with wide gears 67. A further gear 71 mates with the gear 68 of the slide provided on the left in FIG. 5. This gear 71 mates with a rack 72, while the gear 68 provided on the right mates without any intermediate gear, that is directly with a rack 73. The two racks 72, 73 are parts of a continuous rod 74 which is supported in bearing blocks 75, 76 which are secured to the underside of a bearing plate 77 which in turn is carried by the plates 69, 70.

Two electromagnets 78, 79 are mounted on the bearing plate 77. An anchor 80 which is fixedly connected to the rack 72 can move between said electromagnets.

Referring to FIG. 5, it is clear that, upon a movement of the rod 74, caused by the energization of one of the magnets 78, 79, namely the one against which the anchor 80 just then does not rest, the slides 60 are rotated in opposite directions. The arrows 81 to 85 of the direction of rotation correspond to a movement of the rod 77 in direction of the arrow 86. A relatively short movement of the rod 86, namely a movement along a path which the room between the magnets 78, 79 permits, is sufficient to move the slides 60 from the position illustrated in full lines into the position illustrated in dash-dotted lines.

The apparatus of the invention operates as follows:

FIG. 6 illustrates the condition in which the main newspaper row 87 is deflected by the dividing roller (covered up in FIG. 6) so that the newspapers extend onto the track 88. The track 89 which is parallel thereto and is spaced only a small distance from said track 88 is, in that instant, free of newspapers because the papers previously conveyed to this point have already been discharged. In the condition illustrated in FIG. 6, the roller cover 37 is positioned above the dividing roller 14. The pressure roller 27 which is associated with the dividing roller 14 is lifted off from the dividing roller 14 whereby the roller 32 rests on the central portion 31' of the control surface 31. Through this lifting off, the necessary room for the roller cover 37 was also created.

It can be seen in FIG. 3 that, due to the drop between the main roller 11 and the conveyor belt roller 8, the paper edges are slightly spread fanwise which makes the counting by means of the photoelectric cell 55 easier. The papers are pulled forwardly by means of the main roller 11, the peripheral speed of which is slightly faster than the peripheral speed of the conveyor belt 7 and contact with their edge zones the roller cover 37. They are moved along by the dividing roller 13 which is also provided with a friction coating by means of friction. The pressure roller 26 rests with its own weight on the papers 54 and thus reinforces the friction contact between the papers and the dividing roller 13.

If now a desired number of papers has been counted, for example 15 to 20, by means of the photoelectric cell 55 through the light barrier, it is first effected by an electronic control device that the slides 60, which at this time are in the position illustrated in full lines, are moved forwardly by means of the magnets 65 and by means of the effect of its own weight. The magnets 65 repel in this case when they are energized and assist the downward sliding movement. The slides 60 now penetrate between two papers 54 whereby this penetration is made easier by the curved front ends 61 (FIG. 2). The papers 54 slide, as illustrated in FIG. 4, onto the slide 60, whereby they are pushed from the conveyor belt 7. The slides 60 prevent now the papers 54, which slid onto said slides, from a further contact with the dividing roller 13. The remaining papers 54 on the track 88 are discharged by said dividing roller 13.

After this discharge, the magnet 35 (FIGS. 1 and 6) is de-energized and the magnet 36 is energized whereby the swivel piece 30 is swung in a clockwise direction. The roller cover 37 reaches thereby a position above the dividing roller 13. At the same time the scanning roller 32 of the pressure roller 26 slides onto the control surface 31 and is through this lifted off from the dividing roller 13. However, the scanning roller 32 of the pressure roller 27 slides off from the control surface and thus gets to rest on the dividing roller 14. When this process is concluded, the slides 60 are swung into the position illustrated in dash-dotted lines which (see FIG. 5) is done by de-energizing the one of the magnets 78, 79 and energizing the oppositely positioned magnet. In this position the slides 60 can no longer support the papers and they drop downwardly between the slides. They are now conveyed in the already described manner, namely this time by the dividing roller 14, and thus reach onto the dividing track 89.

In case of a breakdown in the described apparatus or in an apparatus for further processing, the deflector plate 50 (FIG. 2) is operated and the divided streams are discharged over the conveyor belt 49.

The embodiments of the invention in which an exclusive property or privilege is claimed are defined as follows:

1. In an apparatus for dividing a single row of tierlike superposed flat articles into two divided rows, the combination comprising:
   first conveyor means for conveying said tierlike superposed flat articles in said single row toward an end thereof;
   second and third conveyor means each adapted to convey said tierlike superposed flat articles away from said end of said first conveyor means;
   means for supporting said second and third conveyor means in a generally coplanar relationship;
   drive means adjacent said end of said first conveyor means for driving said tierlike superposed flat articles toward and onto a select one of said second and third conveyor means; and
   diverting means for diverting the movement of said tierlike superposed flat articles exiting said first conveyor means from engaging said drive means during the interval of time required to shift the flow of tierlike superposed flat articles from one of said second and third conveyor means to a selected other of said second and third conveyor means, said diverting means thereafter depositing said articles onto said drive means and said selected one of said second and third conveyor means, said diverting means including means for preventing said superposed flat articles from becoming jammed together so that said tierlike superposed relationship between articles is maintained during said diverting movement.

2. The improvement according to claim 1, wherein said drive means comprises selectively actuatable first and second drive mechanisms, said first drive mechanism effecting a drive of said articles from said first conveyor means to said second conveyor means, said second drive mechanism effecting a drive of said articles from said first conveyor means to said third conveyor means; and
   including blocking means for rendering one of said first and second drive mechanisms ineffective to thereby effect a transfer by the other of said first and second drive means of said tierlike superposed flat articles onto a selected one of said second and third conveyor means.

3. The improvement according to claim 2, wherein said first and second drive mechanisms each comprise a roller mechanism.

4. The improvement according to claim 3, wherein said roller mechanisms each comprise a dividing roller and a pressure roller mounted above said dividing roller, and includes lift support means for supporting said pressure roller to be lifted from engagement with said dividing roller.

5. The improvement according to claim 4, wherein said pressure rollers are shorter than said dividing roller.

6. The improvement according to claim 3, wherein said rollers are arranged in a V-shaped arrangement, the diverging end of said V-shaped arrangement facing said end of said first conveyor means.

7. The improvement according to claim 6, wherein the end of each of said pressure rollers facing said first conveyor means is conically shaped.

8. The improvement according to claim 7, wherein said blocking means comprises a movable roller cover which is supported for movement between said superposed articles and one of said rollers to prevent said transfer of articles by said one roller.

9. The improvement according to claim 1, wherein said diverting means comprises a swordlike slide and drive means for inserting said slide between a pair of mutually adjacent articles exiting from said first conveyor means.

10. The improvement according to claim 9, wherein said slide includes support means for supporting said slide for a reciprocating movement, said slide including means defining a surface onto which said articles slide when said slide functions to divert the flow of said articles.

11. The improvement according to claim 10, including a pair of reciprocating slides each being adapted to engage said articles on a laterally spaced edge thereof to divert the movement of said articles from said first conveyor means.

12. The improvement according to claim 11, including means for supporting each of said slides for movement about parallel pivot axes.

13. The improvement according to claim 1, including a counting device for counting said articles conveyed by said first conveyor means.

* * * * *